United States Patent [19]
Jellison et al.

[11] Patent Number: 5,992,227
[45] Date of Patent: Nov. 30, 1999

[54] AUTOMATIC ADJUSTABLE WIDTH CHUCK APPARATUS FOR TIRE TESTING SYSTEMS

[76] Inventors: Frank R. Jellison, 2222 38th St., N.W., Canton, Ohio 44709; Francis J. Bormet, 125 Stadium Dr., Tallmadge, Ohio 44278; Richard Cukelj, 16565 Timberline Dr., Strongsville, Ohio 44136; David W. Lees, Sr., 3303 Herriff Rd., Ravenna, Ohio 44266; Keith A. Neiferd, 2865 Kay Blvd., Norton, Ohio 44203; Dennis Allyn Reynolds, 218 Chettenham La., Munroe Falls, Ohio 44262; Christy Quinn, 12308 Rogues Hollow Rd., Doylestown, Ohio 44230

[21] Appl. No.: 08/988,119

[22] Filed: Dec. 10, 1997

Related U.S. Application Data

[60] Provisional application No. 60/036,719, Jan. 24, 1997.

[51] Int. Cl.$^6$ .................................................. G01M 17/02
[52] U.S. Cl. .................................................. 73/146
[58] Field of Search .................................................. 73/146

[56] References Cited

U.S. PATENT DOCUMENTS

| | | |
|---|---|---|
| 2,771,176 | 11/1956 | Clark et al. . |
| 2,781,119 | 2/1957 | Talbot et al. . |
| 2,901,085 | 8/1959 | McCoy . |
| 3,081,959 | 3/1963 | Goodwin . |
| 3,089,576 | 5/1963 | Sauer et al. . |
| 3,102,627 | 9/1963 | Acton et al. . |
| 3,221,364 | 12/1965 | Bailey et al. . |
| 3,244,575 | 4/1966 | Sabo et al. . |
| 3,346,434 | 10/1967 | Fulton . |
| 3,687,260 | 8/1972 | Willows . |
| 3,817,003 | 6/1974 | Monajjem . |

(List continued on next page.)

FOREIGN PATENT DOCUMENTS

| | | |
|---|---|---|
| 2104010 | 3/1983 | United Kingdom . |

OTHER PUBLICATIONS

Exhibit 1—photograph of a prior tire testing machine known as M–82.
Exhibit 2—photograph of a prior tire testing machine known as FD90.
Exhibits 3–4, photographs of a prior tire testing machine known as D90.
Exhibit 5—photograph of a prior tire testing machine known as D92.
Exhibits 6–7, photographs of a prior tire uniformity machine, Model 2D80.
Exhibit 8—photograph of a prior tire testing machine.
Exhibits 9–24—photographs of a prior tire testing machine known as D70.

(List continued on next page.)

*Primary Examiner*—Joseph L. Felber

[57] ABSTRACT

An automatic, adjustable width chuck apparatus for securely positioning tires in a tire testing machine includes a lower chuck in the form of a spindle assembly and an upper chuck in the form of a movable chuck assembly. The spindle assembly includes a rotatable spindle having a tapered portion and the chuck assembly includes a chuck member having a mating tapered recess. The spindle assembly and chuck assembly each carry a half-rim for engaging the lower and upper beads of the tire. The entire chuck assembly is movable toward and away from the spindle assembly under force of a hydraulic cylinder and can be stopped at any point between fully raised and fully lowered positions. In addition, the chuck member is independently movable by pneumatic cylinders to engage the spindle member at various relative positions of the spindle and chuck assemblies. The movable chuck has an increased stroke length to accommodate various size tires. The pneumatic cylinders maintain the force with which the chuck member engages the spindle substantially constant. A tire stripper mechanism is provided to forcibly remove the tire from the rim of the chuck assembly upon completion of the testing.

32 Claims, 10 Drawing Sheets

U.S. PATENT DOCUMENTS

| | | |
|---|---|---|
| 3,837,689 | 9/1974 | Csatlos . |
| 3,849,942 | 11/1974 | Monajjem . |
| 3,914,907 | 10/1975 | Hofelt, Jr. et al. . |
| 4,023,407 | 5/1977 | Vanderzee . |
| 4,024,372 | 5/1977 | Herrmann . |
| 4,191,055 | 3/1980 | Orem et al. . |
| 4,241,300 | 12/1980 | Hayes et al. . |
| 4,458,527 | 7/1984 | McFarland et al. . |
| 4,489,598 | 12/1984 | Beebe et al. . |
| 4,576,040 | 3/1986 | Cargould . |
| 4,638,756 | 1/1987 | Collmann . |
| 4,702,287 | 10/1987 | Higble et al. . |
| 4,704,900 | 11/1987 | Beebe . |
| 4,723,563 | 2/1988 | Kane . |
| 4,785,864 | 11/1988 | Cargould et al. . |
| 4,805,125 | 2/1989 | Beebe . |
| 4,815,004 | 3/1989 | Beebe . |
| 4,846,334 | 7/1989 | Cargould . |
| 4,852,398 | 8/1989 | Cargould et al. . |
| 4,870,858 | 10/1989 | Smith et al. . |
| 4,885,936 | 12/1989 | Hayes . |
| 4,896,531 | 1/1990 | Hayes . |
| 4,976,141 | 12/1990 | Cargould et al. . |
| 5,027,649 | 7/1991 | Himmler . |
| 5,029,467 | 7/1991 | Cargould .................................. 73/146 |
| 5,067,348 | 11/1991 | Himmler et al. . |
| 5,107,702 | 4/1992 | Iwama ...................................... 73/146 |
| 5,378,273 | 1/1995 | Taguchi et al. . |
| 5,390,540 | 2/1995 | Mallison . |
| 5,481,907 | 1/1996 | Chasco et al. . |
| 5,566,816 | 10/1996 | Gross et al. . |
| 5,605,215 | 2/1997 | Gross et al. . |

OTHER PUBLICATIONS

Eagle Picher, Akron Standard Divison, product brochure submitted in its entirety, entitled "Are you really saving when you buy used Tire Uniformity Machines? Or . . . ", date unknown.

2 page product brochure of a prior tire testing machine entitled "Tire Uniformity Equipment", date unknown.

Eagle Picher, Akron Standard Division, product brochure submitted in its entirety, entitled "The Standard of the World", date unknown.

Advertisement showing a prior tire testing machine known as 2D80.

A copy of an Akron Standard product brochure entitled "Setting The Standards for the World", submitted in its entirety, date unknown.

Akron Standard Sales Specification for Tire Uniformity Machine Model D90, Jan. 1990.

Akron Standard Sales Specification for Tire Uniformity Machines, Series D70, Apr. 1997.

One page advertisement showing a prior tire testing machine, Akron Special Machinery, Inc., date unknown.

One page advertisement showing a prior tire testing machine known as X75–13 TUO, Akron Special Machinery, Inc., date unknown.

Exhibits 25–28 from Kobe Steel, Ltd., drawing showing a prior tire testing machine known as PC–UXO–P2, date unknown.

Exhibitsn 29–39 from Hofmann Maschinenbau Gmbh, drawing showing prior tire testing machines, copyright 1994.

AUTOMATIC ADJUSTABLE WIDTH CHUCK APPARATUS FOR TIRE TESTING SYSTEMS

This application claims benefit of provisional application Ser. No. 60/036,719, filed Jan. 24, 1997.

TECHNICAL FIELD

The present invention relates to a chuck apparatus for holding rotating objects. More particularly, the invention relates to an automatic, adjustable width chuck apparatus for securely positioning a tire while the tire is being tested by a tire uniformity testing system.

BACKGROUND ART

Tire testing systems which examine tires in order to determine the presence of any irregularities or nonuniformities are known in the art. Known systems typically move a tire to a testing station where it is engaged by some form of chuck apparatus and inflated to its normal pressure. The tire is rotated at a standard speed against a loadwheel. Data taken from load cells to which the loadwheel is attached is used to detect the presence of any irregularities which may have arisen during the manufacturing process. Additionally, the system typically measures the size of the irregularities and is equipped with devices for correcting the irregularities, for example, grinding devices which remove material from the tire.

It was an objective of prior art tire testing machines to provide proper positioning of the tire in the machine so as to facilitate accurate detection, measurement, and correction of any irregularities in the tire. As explained below, however, although prior art chuck apparatus have performed adequately in holding the tire during testing and correcting procedures, there remains room in the art for improvement.

One prior art chuck apparatus for use in a tire uniformity machine is disclosed in U.S. Pat. No. 4,023,407 and comprises an upper chuck and a lower chuck, each of which has a rim secured thereto for respectively engaging the upper and lower beads of the tire. The upper chuck is moved toward the lower chuck by a hydraulic cylinder to clamp the tire between the rims. The upper chuck includes a slidable plunger having a tapered nose that mates with a tapered recess formed in the lower chuck. A spring surrounds the plunger and is compressed upon moving the chucks together. The patent discloses that when the spring is fully compressed the chucks are in their closed and locked position. Thus, the force exerted by the spring is used to lock the tapered nose in the recess of the lower chuck.

Another prior art chuck apparatus for a tire testing machine is disclosed in U.S. Pat. No. 4,852,398 and includes a female member secured to an upper rim and a male member secured to a lower rim. The female member has a tapered recess that receives the nose cone of the male member, the lower male member being movable toward the female member by a hydraulic cylinder. A spring located within the male member biases the nose cone toward the recess. The hydraulic cylinder moves the entire male member toward the female member until the nose cone seats in the tapered recess, and the cylinder continues to move toward the female member which compresses the spring and increases the locking force exerted by the spring. The patent discloses that the spring force frictionally couples the nose cone to the tapered recess of the female member.

The prior art chuck apparatus discussed above perform the function of positioning a tire in a testing machine between rims carried by the upper and lower chuck members; however, such assemblies have drawbacks. For example, the distance that the one chuck member can be moved toward or away from the other chuck member is limited. Also, the use of springs in prior art chuck assemblies imposes limitations regarding the distance the one chuck member may be moved toward the other member and, in addition, affects the consistency of the forces applied to enhance locking together of the respective components.

Additionally, prior art chuck apparatus must use a spring which has a force constant and length that exerts the necessary force to lock the chuck members together. If the distance the chuck member is moved (i.e., its stroke length) is increased, then the length of the spring must also be increased in order to exert sufficient force against the chuck member over such distance. However, increasing the stroke length by a considerable amount would require a very large, complex spring capable of exerting force over the increased range of movement. Utilizing such a spring is neither practical nor economical. Thus, the distance over which one chuck member can be moved in prior art machines is constrained by the stiffness and length characteristics of the spring. In addition, in view of the fact that the force exerted by a spring varies as the length of the spring changes, the locking force exerted on prior art chuck members varies as the length of the spring changes. Consequently, prior art chuck apparatus typically do not apply a substantially constant force to lock and maintain the chuck members together.

Accordingly, there is a need in the art for an improved chuck apparatus which is free of the limitations of conventional apparatus, provides an increased stroke length in order to accommodate various size tires, and applies a substantially constant force to lock the chuck members together.

SUMMARY OF THE INVENTION

The invention provides an automatic adjustable width chuck apparatus for supporting a tire while the tire is subjected to a testing procedure to determine whether the roundness, mechanical uniformity, etc., of the tire are acceptable. In addition, the apparatus may be used to support the tire during an optional grinding procedure performed subsequent to the testing procedure. The chuck apparatus includes a lower chuck and an upper chuck movable toward and away from the lower chuck. The upper chuck is moved by an actuator that permits the chuck to be stopped at any location between fully raised and lowered positions.

In more specific embodiments, the lower chuck is in the form of a spindle assembly comprising a spindle housing and a rotatable spindle disposed therein. The spindle has a first end including a tapered male portion and a second end including a drive sprocket which is rotated by a drive belt to rotate the spindle. The upper chuck is in the form of a movable chuck assembly disposed above the spindle assembly and includes a chuck member with a tapered female portion that mates with the male portion of the spindle. The spindle assembly and the movable chuck assembly each carry a rim for sealingly engaging the lower and upper beads of the tire to permit its inflation and rotation during testing.

The movable chuck assembly preferably includes an outer housing and an inner housing, the inner housing being rotatable but otherwise fixed with respect to the outer housing. The chuck member is located within the inner housing and is slidable with respect thereto. The chuck member is driven by a pair of pneumatic cylinders secured to the outer housing. The tapered female portion of the chuck member lockingly receives the tapered male portion of the rotatable spindle. A hydraulic actuator is activated to move the entire chuck assembly toward the spindle assembly until both rims engage the beads of the tire. The pneumatic cylinders are activated to move the chuck member relative to the inner and outer housings independently of moving the entire chuck assembly, thereby achieving positive locking engagement of the tapered recess with the tapered nose of the spindle. This aspect of the invention provides an increased stroke length for the chuck which permits the apparatus to engage a wide range of tire sizes as compared with prior art chuck assemblies.

Additionally, the output of the air cylinders may be precisely controlled to exert a substantially constant locking force against the nose of the spindle over the entire range of motion of the chuck member, unlike prior art chuck apparatus which utilized springs to lock the chuck member to the spindle. Further, the apparatus includes a sensor and permits limited movement of the chuck assembly over less than its entire path of travel, thereby reducing cycle time and increasing efficiency. In another aspect of the invention, a tire stripper mechanism is mounted on the 5 chuck assembly for removing the tire therefrom.

Other features, benefits and advantages of the present invention will be apparent from the following detailed description of preferred embodiments thereof, taken in conjunction with the following drawing figures.

BRIEF DESCRIPTION OF THE DRAWINGS

FIG. 5A is an enlarged view of a portion of the chuck apparatus shown in FIG. 5, the portion being indicated by a dashed circle in FIG. 5;

DETAILED DESCRIPTION OF PREFERRED EMBODIMENTS

Figure 1:
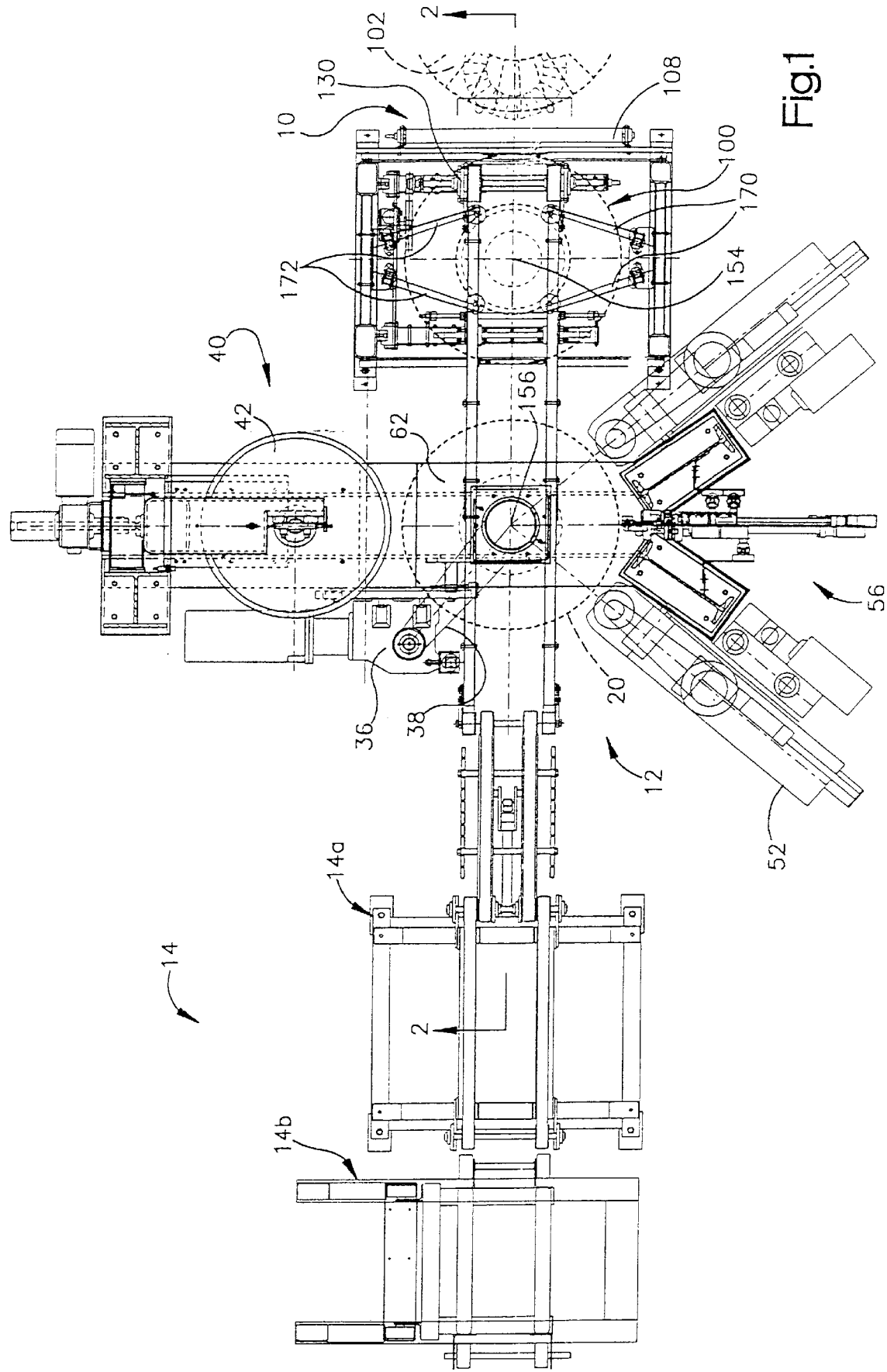
FIG. 1 is a plan view of a tire testing system including an automatic, adjustable width chuck apparatus constructed according to a preferred embodiment of the 15 present invention.

FIG. 1 illustrates, in plan view, the overall arrangement of a tire testing system which includes an automatic adjustable width chuck apparatus constructed according to a preferred embodiment of the invention. The overall tire testing system is more fully disclosed in co-pending application Ser. No. 08/988,480, filed on Dec. 10, 1997, and entitled TIRE UNIFORMITY TESTING SYSTEM, the subject matter of which is hereby incorporated by reference. Accordingly, the detailed description which follows relates primarily to the adjustable chuck apparatus; however, the overall system is discussed below briefly for sake of clarity and in order to set forth the environment in which the inventive chuck apparatus is primarily intended for use. Of course, it will be recognized by those skilled in the art that features of the adjustable chuck apparatus may render the apparatus useful in applications other than a tire testing machine. Thus, the invention should not be construed as necessarily being limited to any particular environment.

Referring to FIG. 1, the overall tire testing system comprises the following subsystems: an inlet conveyor 10, a testing station 12, an exit module 14, and an optional marking station 14a and tire sorting mechanism 14b. A tire positioned at the testing station 12 is tested and optionally ground to adjust the roundness, mechanical uniformity and/or any other physical properties of the tire. In FIG. 1, a tire indicated by reference character 20 (shown in phantom) is delivered to the testing station by the inlet conveyor 10 so that the tire is clamped between a lower rim 24 and an upper rim 26 (shown best in FIG. 3). The rims are carried by upper and lower chucks that comprise the adjustable chuck apparatus of the present invention and are discussed in detail below.

Figure 3:
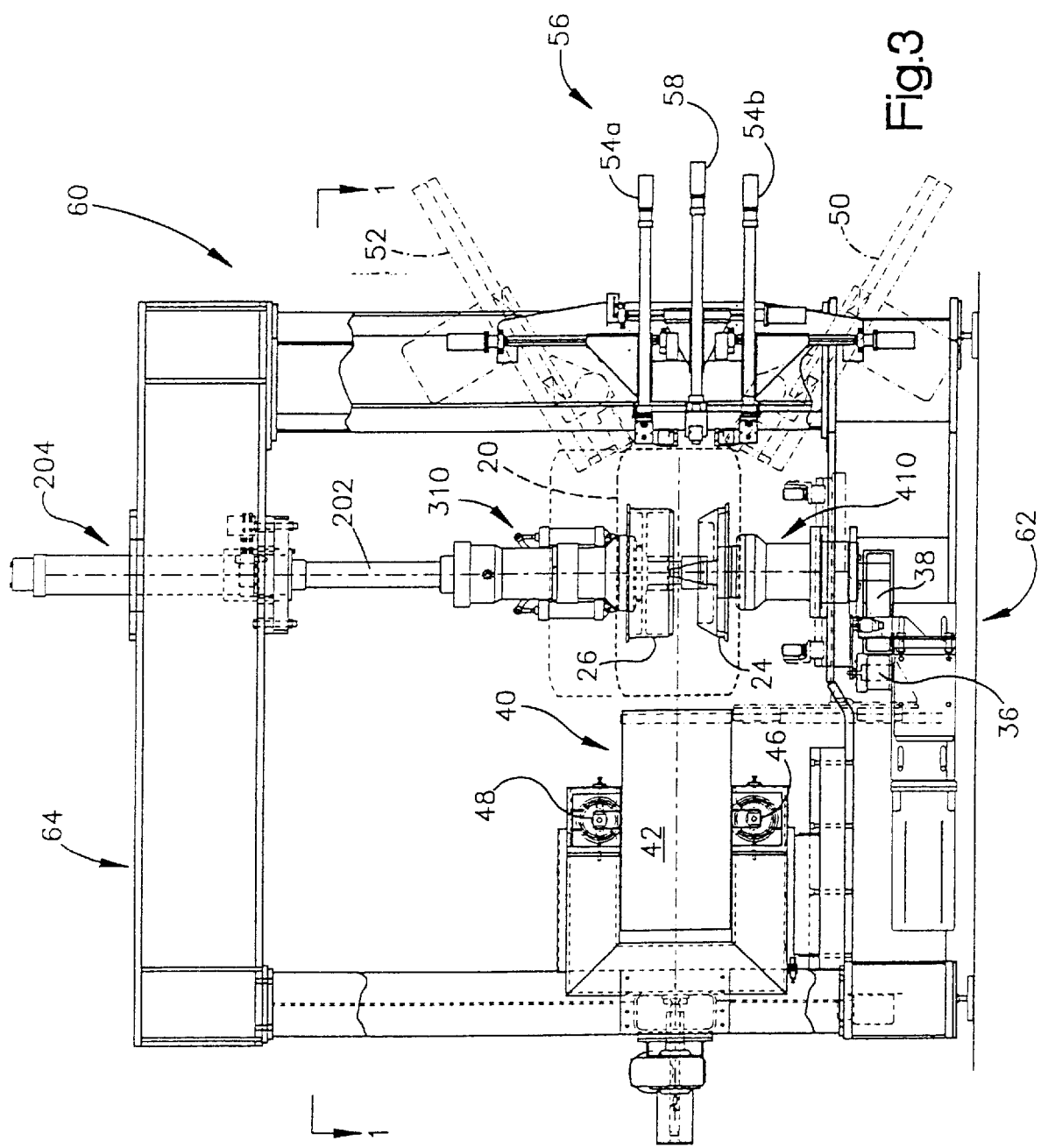
FIG. 3 is a side elevation view of a tire testing station and the chuck apparatus of FIGS. 1 and 2.

The tire is clamped between the rims 24, 26 and inflated. After inflation, a loadwheel assembly 40 including a loadwheel 42 is moved into abutting relationship with the outer surface of the tire 20. As is conventional, the tire is rotated against the loadwheel which monitors the load exerted by the tire via load cells 46, 48 (as seen in FIG. 3). As is known in the art, data taken from the load cells is used to determine the uniformity of the tire. The loadwheel is more fully disclosed in co-pending application Ser. No. 08/988,509, filed on Dec. 10, 1997, and entitled LOADWHEEL ASSEMBLY FOR TIRE TESTING SYSTEMS, the subject matter of which is hereby incorporated by reference. If desired, adjustments to the uniformity of the tire are made by one or more grinders, such as grinders 50, 52 for grinding the lower and upper portions of the tire (as viewed in FIG. 3) and a grinder (not shown) for grinding the center portion of the tire.

A probe system, indicated generally by the reference character 56, may form part of the testing station and in the illustrated embodiment (as seen best in FIG. 3) includes upper and lower side wall sensor assemblies 54a, 54b, upper and lower shoulder sensors (not shown) and a center tread sensor 58. The probe system is more fully disclosed in the aforementioned co-pending application relating to the overall tire testing system.

Figure 4:
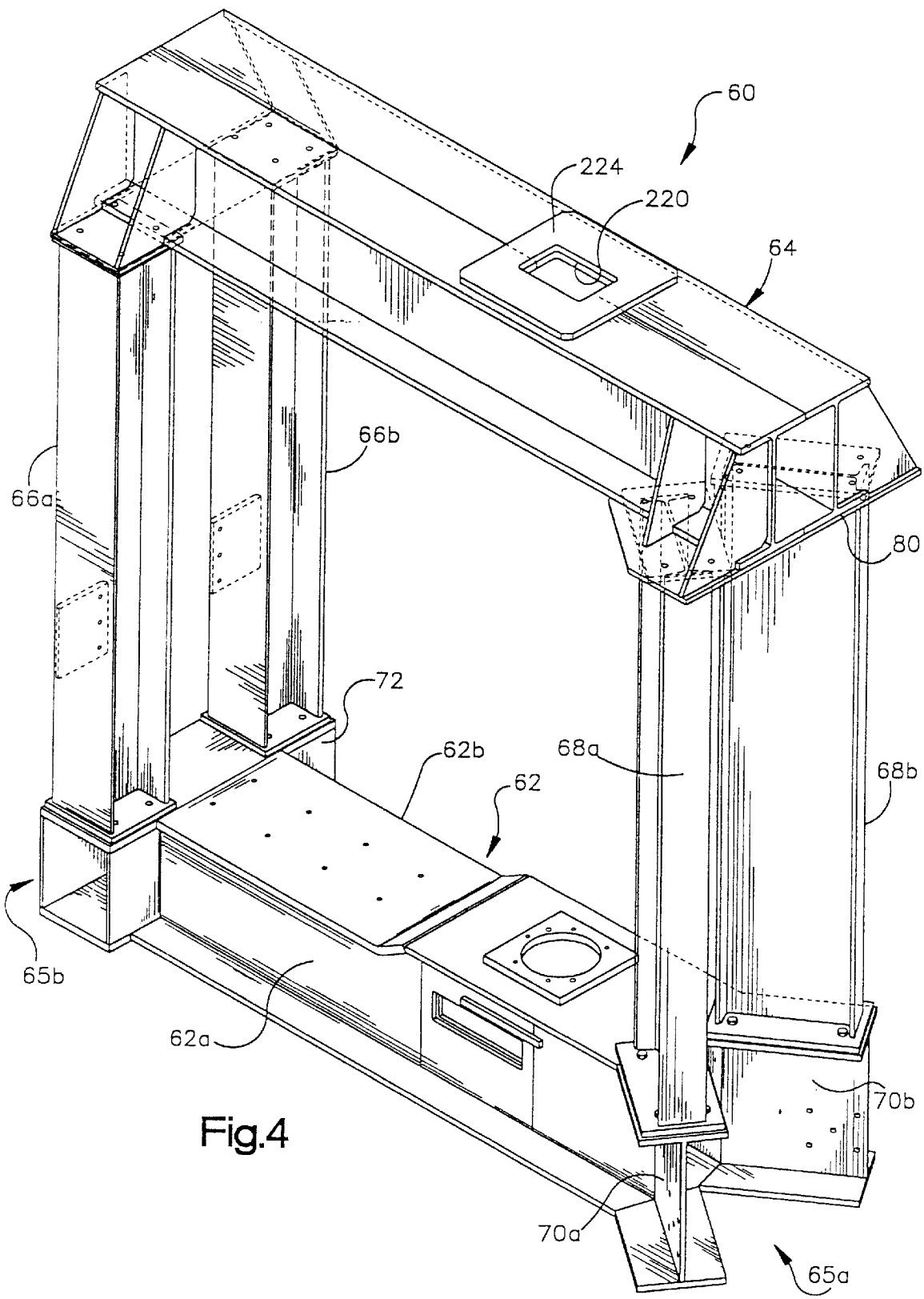
FIG. 4 is a perspective view of a frame forming part of the tire testing station of FIG. 3.

The upper and lower chucks, load-wheel assembly 40, grinders 50, 52 and probe system 56 are mounted to a gantry-like frame system indicated generally by the reference character 60 in FIG. 3. In the illustrated and preferred embodiment, the frame includes a base 62, a cross beam 64 supported a predetermined distance above the base by pairs of columns 66a, 66b and 68a, 68b. The base 62 comprises a pair of horizontal I-beams preferably welded together to form a unitary member. As seen in FIG. 4, in the preferred embodiment, one end 65a of the base 62 is configured as a "Y" (as viewed in plan) and includes end sections 70a, 70b, whereas an opposite end 65b of the base 62 is configured somewhat in the shape of a "T" and includes cross beam 72. The frame 60 is described more fully in the aforementioned co-pending application relating to the overall tire testing system.

The inlet conveyor 10 (FIGS. 1 and 2) conveys tires to be tested from a centering station indicated generally by the reference character 100 to the testing station 12. The inlet conveyor is more fully disclosed in co-pending application Serial No. 08/988,478 (Attorney Docket No. 13-867), filed on Dec. 10, 1997, and entitled INLET CONVEYOR FOR TIRE TESTING SYSTEMS, the subject matter of which is hereby incorporated by reference. In operation, a tire to be tested is delivered to the entrance of the centering station 100 by a belt or roller conveyor (not shown). FIG. 1 illustrates a tire, indicated in phantom by the reference character 102, about to be delivered to the inlet conveyor. The inlet conveyor includes a feed or kick roller 108 which moves the delivered tire onto the inlet conveyor mechanism. A tire is delivered to the centering station 100 by the kick roller 108 and then is centered with respect to an axis indicated by the reference character 154. In the preferred embodiment, the centering axis 154 is located a fixed distance from a test station axis 156 (FIGS. 1 and 2) which, in the preferred embodiment, corresponds to the rotational axis of the spindle assembly 410. Accordingly, after a tire is centered at the centering station 100 it is delivered so as to be in alignment with the spindle assembly. With this arrangement, the distance which the tire is moved from the centering station to the testing station is the same for all tires regardless of diameter.

The inlet conveyor operates as follows. Prior to receiving a tire at the centering station, the conveyor unit is lowered by the actuator 142. A tire is driven onto a conveyor by the inlet kick roller 108. Once in the centering station 100, the centering arm actuator (not shown) is actuated to drive centering arms 170, 172 toward the tire until the rollers 176, 176a engage the tire periphery. If a lubricator is present, one of the centering rollers 176a is rotated in order to rotate the tire at the centering station thereby enabling the lubricator to apply a lubricant to the tire 20. Once centered, the conveyor unit is raised by actuator 142 thereby picking up the tire and in effect raising it above the support conveyor. Each roller 176, 176a is mounted such that it can be moved vertically a predetermined distance in order to accommodate relative movement between the tire and the centering arms 170, 172 as the conveyor assembly engages and lifts the tire. The centering arms are then moved outwardly to their retracted positions, and the tire to be tested is supported by the conveyor unit and centered with respect to the axis 154, and is located a predetermined distance from the axis 156 of the testing station.

The conveyor then is actuated to advance the tire a predetermined distance which positions the tire coincident with the axis 156 of the testing station. The actuator 142 is activated to lower the conveyor unit which in effect lowers the tire onto the lower chuck. While the conveyor unit is in the lower position, another tire may be brought into the centering station and subsequently lubricated and centered during the time a tire is being tested at the testing station 12.

Figure 2:
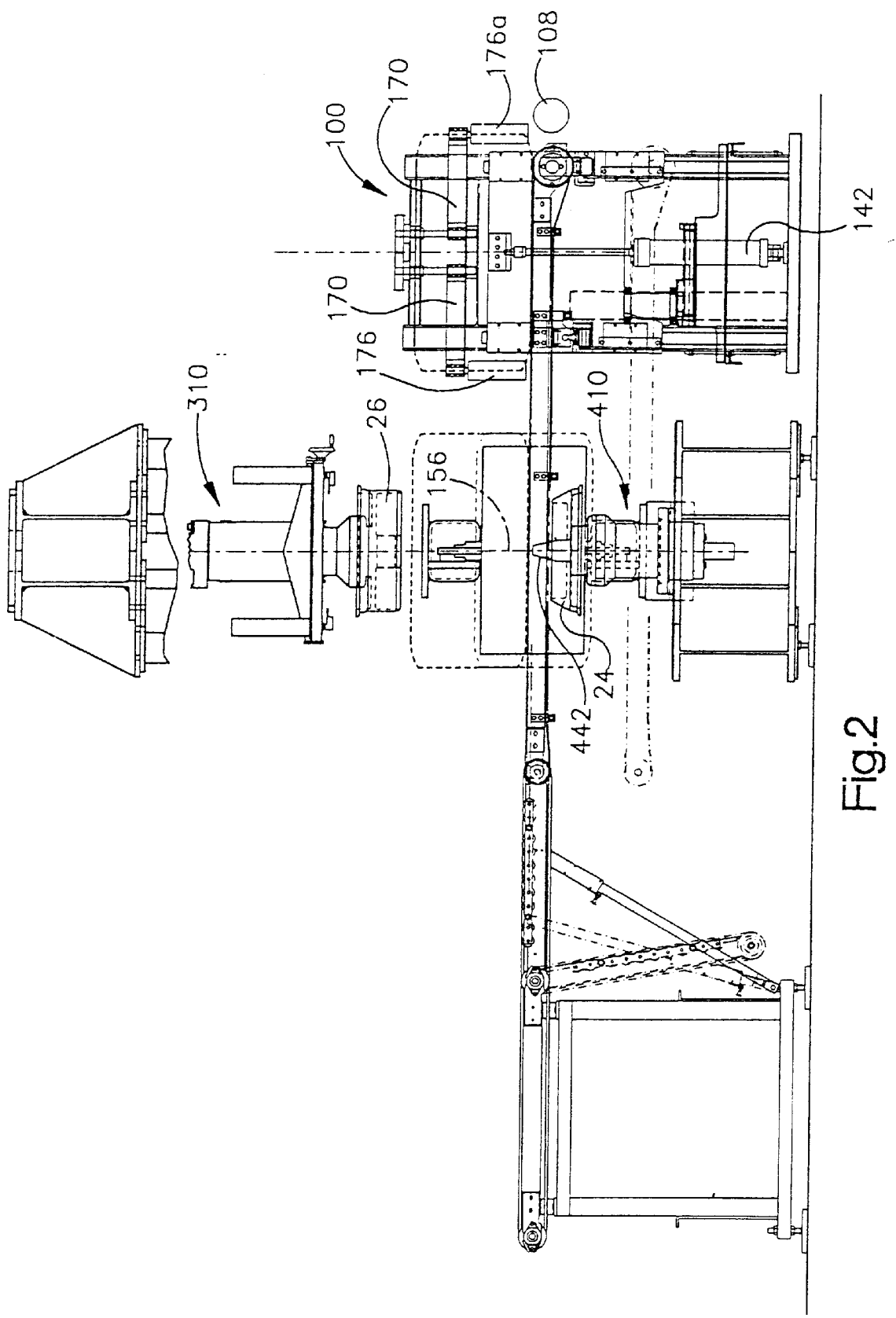
FIG. 2 is a fragmentary front elevation view of the tire testing system and chuck apparatus of FIG. 1.

The adjustable chuck apparatus of the present invention includes a lower chuck and a movable upper chuck. In the preferred embodiment, the lower chuck comprises a spindle assembly 410 fixed to the frame 60, while the upper chuck comprises a reciprocally movable chuck assembly 310 mounted to a cross beam 64 of the frame 60. As seen in FIG. 3, the chuck assembly 310 is mounted to the end of a hydraulic rod 202 forming part of a hydraulic actuator 204. The actuator is secured to the frame cross beam 64 and, as seen best in FIG. 4, extends through an opening 220 formed in the cross beam 64 which is reinforced by a plate 224. When a tire positioned at the testing station is to be tested, the actuator 204 extends the rod 202 to move the chuck assembly 310 toward the spindle assembly 410. The chuck assembly 310 which mounts the upper rim 26 also includes a centrally positioned chuck member 360 with a forward end forming an alignment member which includes a female portion, preferably formed as a tapered recess 368. The recess 368 is configured to receive a male portion, preferably formed as a tapered nose 442, carried by the spindle assembly 410 (FIG. 2). The engagement between the male and female portions maintains a precise alignment between the chuck assembly 310 and the spindle assembly 410 and, along with the tire clamped between the assemblies, is the means by which rotation of the spindle assembly 410 is transferred to the upper rim 26 of the chuck assembly, thereby causing upper and lower rims 26, 24 to rotate in unison when a tire is clamped between the chuck assembly 310 and spindle assembly 410.

Figure 5:
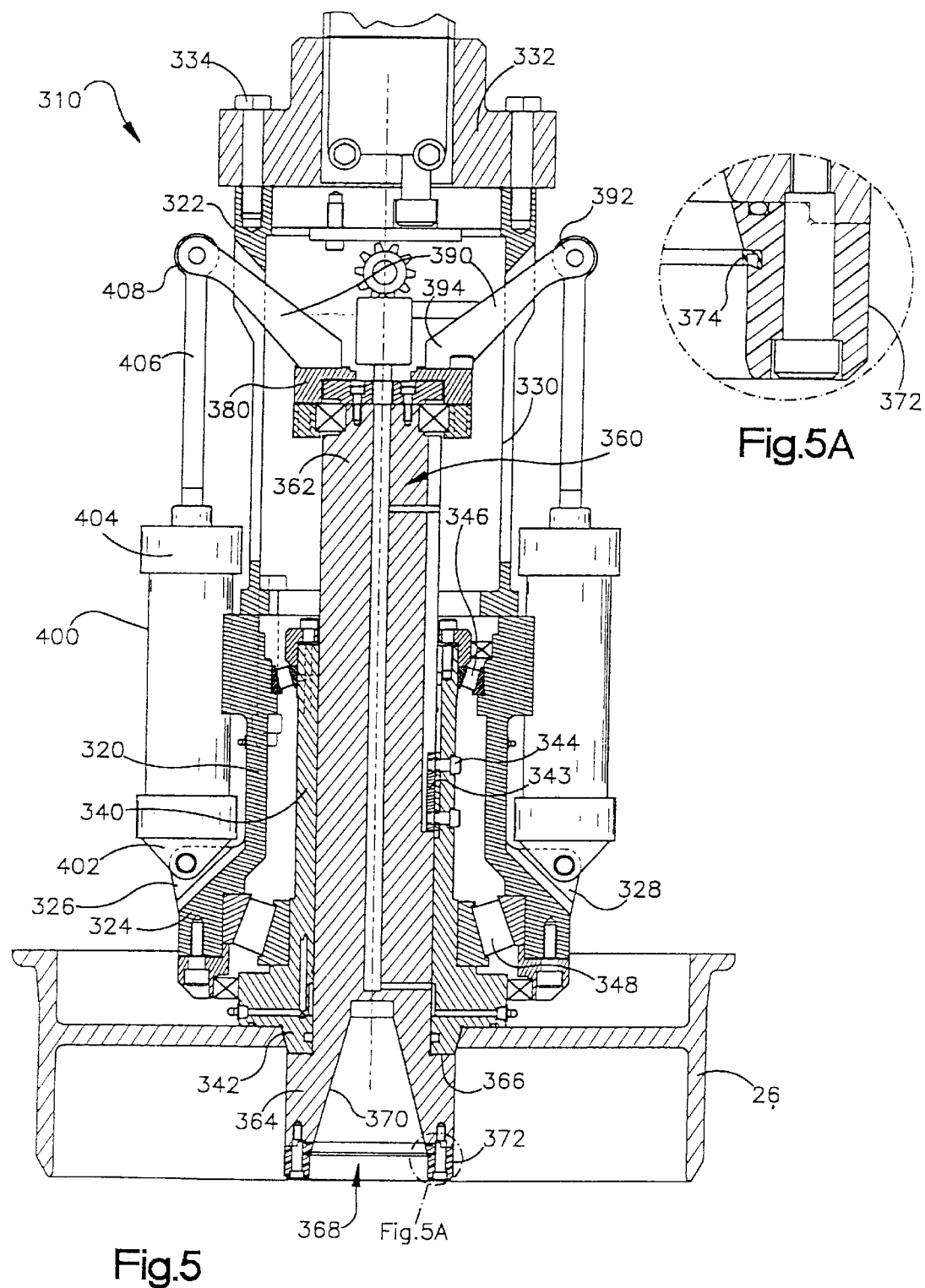
FIG. 5 is a side elevation view of a movable chuck assembly forming part of the tire testing station and chuck apparatus of FIG. 3.

Referring now primarily to FIGS. 5–9, the chuck apparatus may be viewed as comprising two major components: the aforesaid movable chuck assembly indicated by the reference character 310 and the rotatable spindle assembly indicated by the reference character 410. As seen in FIG. 5, the movable chuck assembly 310 includes an outer housing 320 having an upper end 322 and a lower end 324. The relative terms "upper" and "lower" are used herein in order to clearly describe preferred embodiments of the invention as depicted in the Figures and should not be construed in a limiting manner. The outer housing 320 includes brackets 326, 328 for mounting air cylinders 400, as discussed further below. The upper end 322 of the housing includes openings which may be in the form of slots 330 for accommodating a bracket with arms 390 for transmitting motion from the pneumatic cylinders 400 to the movable chuck member 360.

Figures 7, 7A:
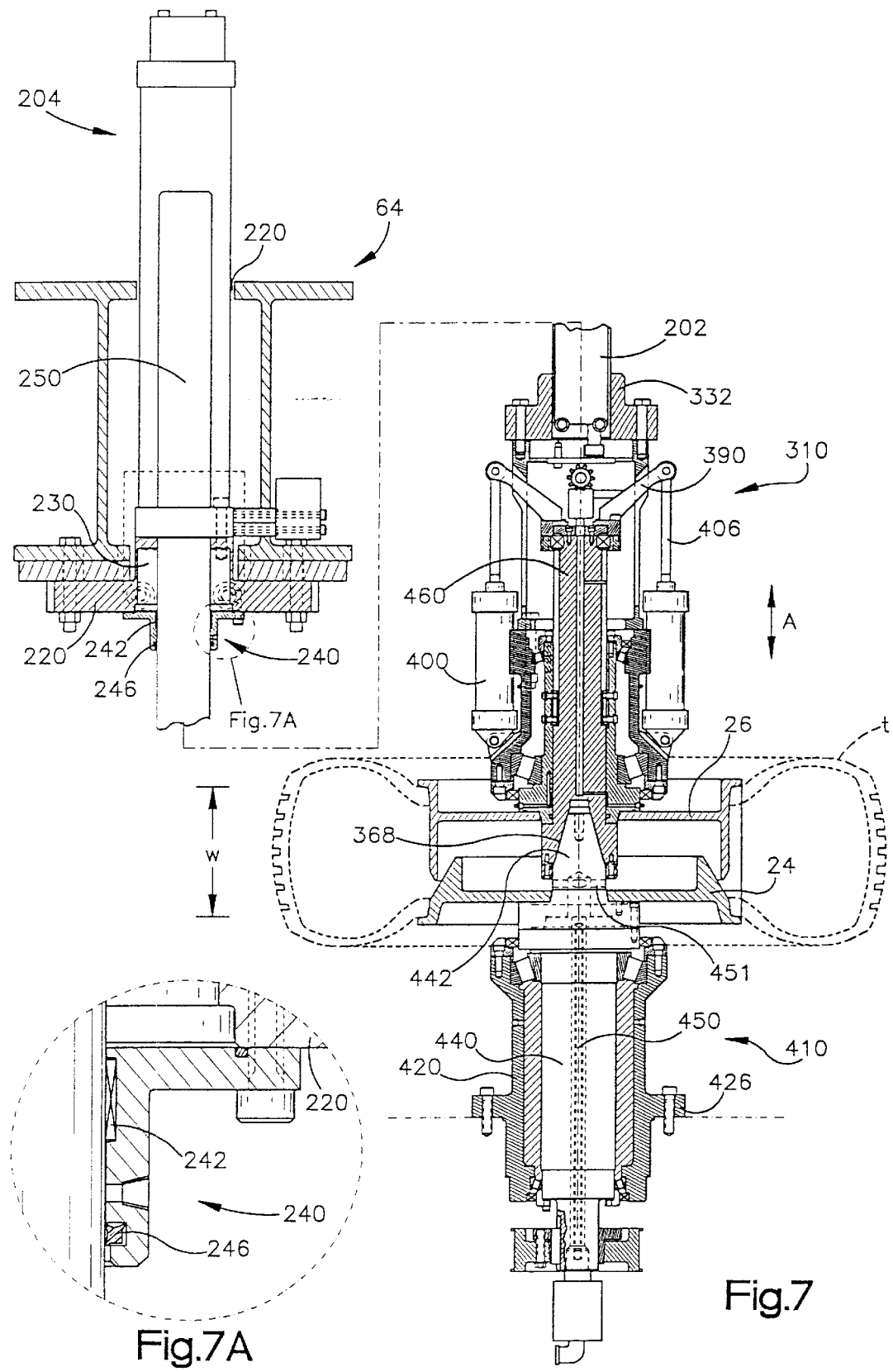
FIG. 7 is a side elevation view showing the chuck assembly of FIG. 5 and the spindle assembly of FIG. 6 in a closed and locked position, with the rims carried by the respective assemblies arranged in a first position for holding a tire having a particular width.
FIG. 7A is an enlarged view of a portion of the chuck assembly actuator shown in FIG. 7.

A hydraulic cylinder rod adapter 332 is secured to the upper end 322 of outer housing 320 via fasteners 334 which 5 may be screws, bolts, or any other suitable connectors. As seen in FIG. 7, the adapter 332 is attached to (or, alternatively, may be formed integrally with) the rod 202 of the hydraulic actuator 204, the actuator including a cylinder disposed in the opening 220 formed in the frame 60 of the apparatus (e.g., as seen in FIG. 4). A tracker bar 250 extends through suitable openings in the frame and is attached to the chuck assembly to prevent the rod 202 and chuck from rotating out of alignment.

The actuator 204 is activated to move the entire chuck assembly 310 toward and away from the spindle assembly 410 positioned thereunder. As seen in FIGS. 7 and 7A, a cylinder mount 221 is attached to the underside of the frame cross beam 64 and a cam roller 230 is provided around the rod 202. A cylinder cap seal 240 is disposed externally to the cylinder 204 and is fixed to the cylinder mount 221 to provide a seal about the exterior of rod 202. The cap seal 240 encircles the rod 202 and houses a bushing 242 and an annular seal 246 which contact the rod. A hydraulic fluid containing chamber is formed by the bushing and the seal so that as the rod 202 is extended, any fluid on the rod is removed by the seal and collected in the chamber to prevent hydraulic fluid from dripping on the tire.

The chuck assembly 310 includes an inner housing 340 disposed within the outer housing 320 and rotatable relative thereto via tapered roller bearings 346, 348. Inner housing 340 has a stepped lower end 342 configured to receive an upper rim 26 (as best seen in FIG. 7). The upper rim 26 engages the upper bead of a tire as described above and as known in the art. The inner housing includes a key 343 attached to the movable chuck member 360 via fasteners 344. The key 343 rides in a slot formed in chuck member 360 to permit the chuck member to move linearly with respect to inner housing 340. However, as is conventional, the key 343 prevents the chuck member 360 from rotating relative to the inner housing member 340. Consequently, rotating the chuck member 360 also rotates the inner housing member 340.

Figure 6:
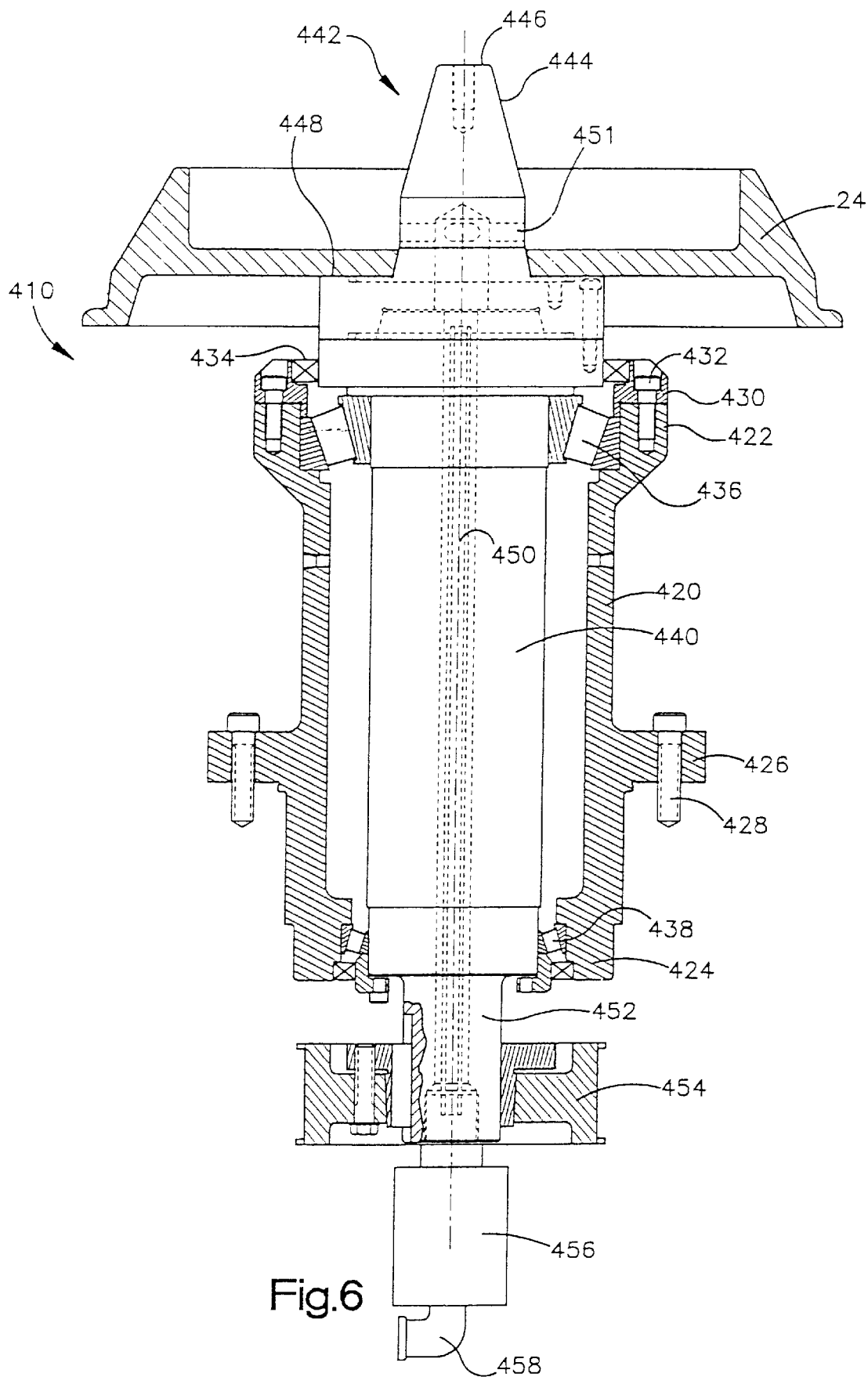
FIG. 6 is a side elevation view of a spindle assembly which cooperates with the chuck assembly shown in FIG. 5.

The movable chuck member 360 includes an upper end 362 and a lower end 364. The upper end 362 has attached thereto a collar 380 which is secured to ends 394 of the bracket arms 390, the opposite ends 392 of the arms being attached to rods 406 of air cylinders 400. As discussed below, this structure transmits motion from the air cylinders 400 to the chuck member 360 to move the chuck member linearly with respect to both the outer housing 320 and the inner housing 340. The lower end 364 of the chuck member includes a stepped portion 366 which engages the end of inner housing 340 when the chuck member is fully retracted (as shown in FIG. 5). A collar 372 is attached to lower end 364 by suitable fasteners. The tapered recess 368 formed in the lower end 364 of the chuck member has an inner wall portion 370 configured to mate with the tapered nose 442 of the spindle assembly 410 (FIG. 6, discussed below). The inner wall of collar 372 is provided with a seal member, such as O-ring 374, which serves to seal the junction between the nose 442 and recess 368 to prevent inflation air entering between the components.

The pneumatic cylinders 400 are fixedly mounted to outer housing 320 of movable chuck assembly 310 via brackets located at the cylinder butt end 402 and at a position intermediate the butt end 402 and rod end 404. The rods 406 of the cylinders 400 extend upward and have their ends 408 secured to ends 392 of bracket arms 390. Upon actuation of the cylinders 400, the rods 406 are either retracted or extended with the bracket arms 390 riding in slots 330 of outer housing 320. Linear movement of the cylinder rods 406 thus is transmitted to the upper end 362 of chuck member 360 and moves the lower end 364 and recess 368 of the chuck member toward or away from the tapered nose 442 of the spindle assembly 410. As such, the entire chuck assembly 310 is movable toward and away from the spindle assembly 410 upon actuation of the hydraulic cylinder 204; and, in addition, the chuck member 360 is independently movable relative to the inner and outer housings 320, 340 of the chuck assembly upon actuation of the air cylinders 400. This allows the chuck member 360 to be retracted from the spindle 440 so that the entire chuck assembly does not need to be fully raised in order to remove a tire from the testing station. While actuators 400 are air cylinders in a preferred embodiment, those skilled in the art will recognize that pneumatic or hydraulic cylinders may be utilized to move the chuck member. Further, it is possible to use a mechanical drive device such as a motor driven gear assembly, lead screw, etc., in lieu of air cylinders.

Turning now to FIG. 6, the rotatable spindle assembly 410 includes an outer housing 420 having an upper end 422 and a lower end 424. The housing 420 preferably is provided with a flange 426 for removably securing the spindle assembly 410 to the frame 60 of the tire testing system. This aspect of the invention provides a spindle assembly 410 that is in the form of a removable cartridge wherein the entire assembly may easily be attached and detached from the frame of the system, thus providing a modular component with accompanying flexibility in use. The flange 426 may be secured to the frame by any suitable fasteners such as bolts 428. Of course, the particular configuration and location of the flange 426 (or other attachment structure) may be varied while still providing the modular capabilities of the spindle assembly 410. This feature also provides improved accessibility to the components and thus makes system maintenance less involved than in prior art systems.

A cap member 430 is secured to the upper end 422 of housing 420 by suitable fasteners such as screws 432 and a bushing 434 is located between the cap and the exterior of the spindle 440. Tapered roller bearings 436, 438 are provided between the housing 420 and the spindle 440 at the upper and lower ends thereof to facilitate smooth rotation of the spindle 440. The tapered nose 442 has an exterior surface 444 and an end surface 446. The surface 444 is configured to mate with the sidewall 370 of tapered recess 368 of the chuck assembly 310, such mating surfaces preferably being frustoconically shaped. A shoulder or stepped portion 448 is provided to receive a lower rim 24 (FIG. 6) which engages the lower bead of a tire in the same manner as the upper rim 26 carried by chuck assembly 310. In a preferred embodiment, the tapered nose 442 is a replaceable cap attached to the spindle and preferably is formed of steel. Of course, the nose 442 may be a separate element permanently secured to the spindle or, alternatively, it may be an integrally formed part of the spindle.

The spindle 440 has an air conduit 450 formed therein which receives air from an air supply via union valve 456 and elbow fitting 458. The air enters conduit 450 and exits openings 451 located adjacent the tapered nose 442. As seen in FIG. 7, the air exits openings 451 and enters the space between upper and lower rims 26, 24 to inflate a tire which is held by the chuck apparatus. The manner in which the air inflates the tire is known in the art and will not be discussed in detail. However, it should be noted that in the invention air is prevented from entering the space between the tapered nose 442 and the tapered recess 368 of the chuck member 360 by the seal 374, thereby preventing the possibility of the air exerting separation forces on the locked-together spindle 440 and chuck member 360.

Figure 8:
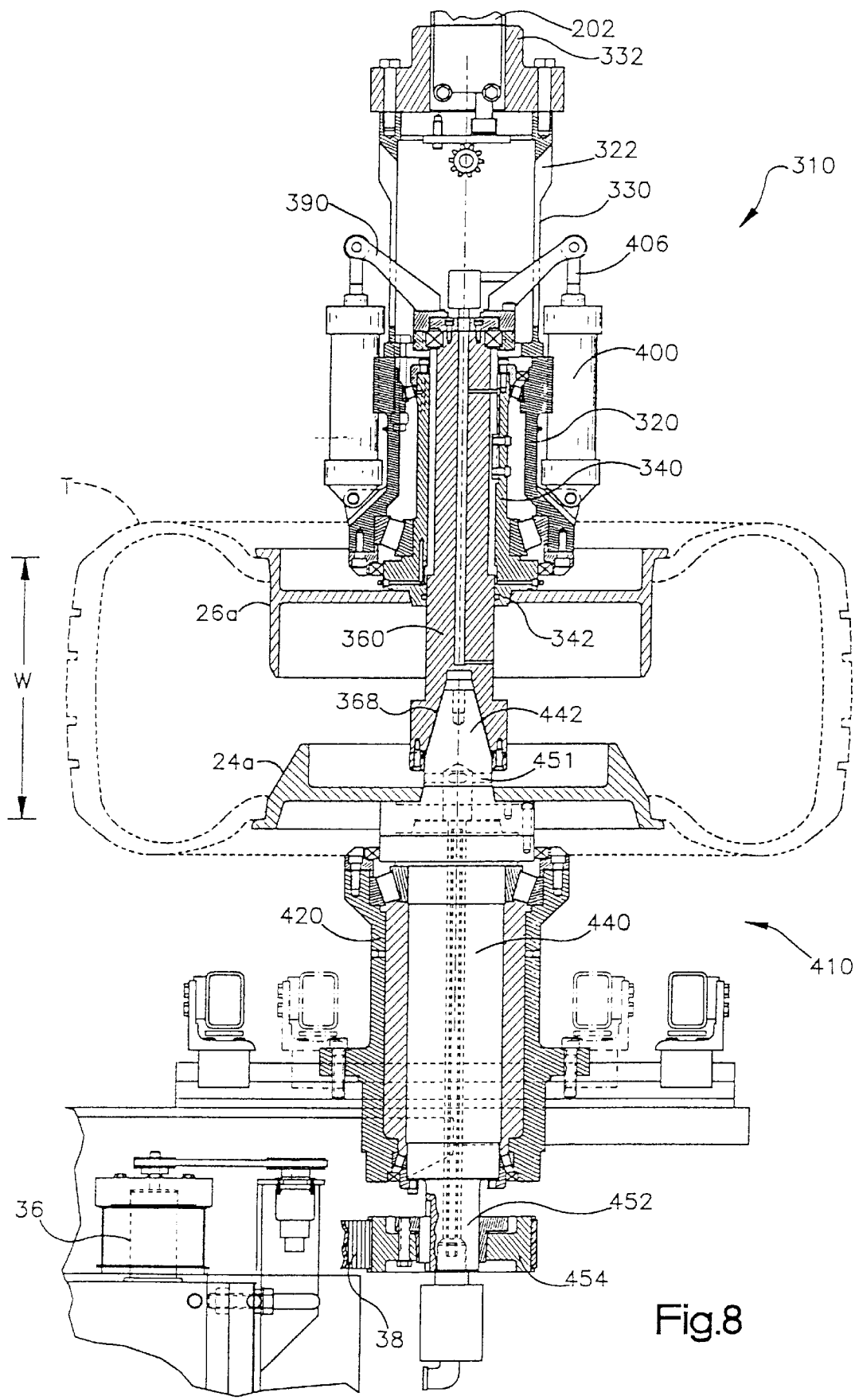
FIG. 8 is a side elevation view showing the chuck assembly of FIG. 5 and the spindle assembly of FIG. 6 in a closed and locked position, with the rims carried by the respective assemblies arranged in a second position for holding a tire having a width greater than the tire held in the position of FIG. 7.

The lower end 452 of the spindle 440 is in the form of a reduced diameter portion attached to a sprocket assembly 454. The sprocket assembly 454 is engaged by a drive belt or pulley 38 connected to a drive mechanism such as a motor 36 in order to rotate the spindle 440 and lower rim 24 (FIGS. 1 and 8). Due to the locking of the spindle nose 442 in the tapered recess 368 of the chuck member 360, and the tire being held between rims 26, 24, rotating the spindle also rotates the chuck member 360 and upper rim 26 (and inner chuck housing 340). Rotation of the upper and lower rims 26, 24 rotates the tire at the testing station in order to carry out the testing procedure as is known in the art.

FIG. 7 is an exploded, partly broken-away view showing chuck assembly 310 and spindle assembly 410 in a closed locked position with a tire "t" having a bead width "w" clamped between the rims 26, 24. The opening 220 in frame 60 of the apparatus receives the cylinder of hydraulic actuator 204 with the rod 202 extending downward. The lower end of rod 202 is connected by adapter 332 to the upper end of outer housing 320 of the chuck assembly as discussed above. The actuator 204 is activated to move the entire chuck assembly 310 along arrow A toward and away from the spindle assembly 410 which, as seen, is fixed to the frame via flange 426. The tire "t" shown clamped in FIG. 7 has a relatively small bead width "w" such that moving the chuck assembly 310 toward spindle assembly 410 via actuator 204 causes the rims 26, 24 to engage the tire beads, and also causes the tapered nose 442 to enter the tapered recess 368 so as to lock the spindle 440 to the chuck member 360. The air cylinders 400 are activated to force the tapered chuck member recess 368 against the tapered spindle nose 442 to enhance locking of the components. Also, because actuation of the air cylinders 400 may be precisely controlled, the amount of force applied to lock the components together may be maintained substantially constant. This was not the case with prior art apparatus that utilized springs to enhance locking of the chuck and spindle components. In order to maintain the locking force substantially constant despite the amount that the rods 406 are retracted to drive the chuck member downwards, the cylinders 400 preferably are provided with relieving regulators (not shown) which release pressure when necessary to exert a constant force on the chuck members.

FIG. 8 shows the apparatus of the invention clamping a tire "T" (indicated in phantom) between upper and lower rims 26a, 24a, the tire "T" having a bead width "W" which is greater than the bead width "w" of tire "t" shown in FIG. 7. It should be noted that rims 26a, 24a may be larger in diameter than rims 26, 24 in order to accommodate the larger diametrical distance of the larger tire "T" and engage the beads thereof. However, due to the increased range of motion of the chuck assembly, it is possible to utilize one set of rims to clamp tires having different size bead widths. Those skilled in the art will appreciate that one or more sets of rims may be used, depending on the range of tire sizes to be held. In any event, the invention accommodates a greater range of tire widths than prior art apparatus due to the ability to move both the entire chuck assembly and the chuck member.

Figure 10:
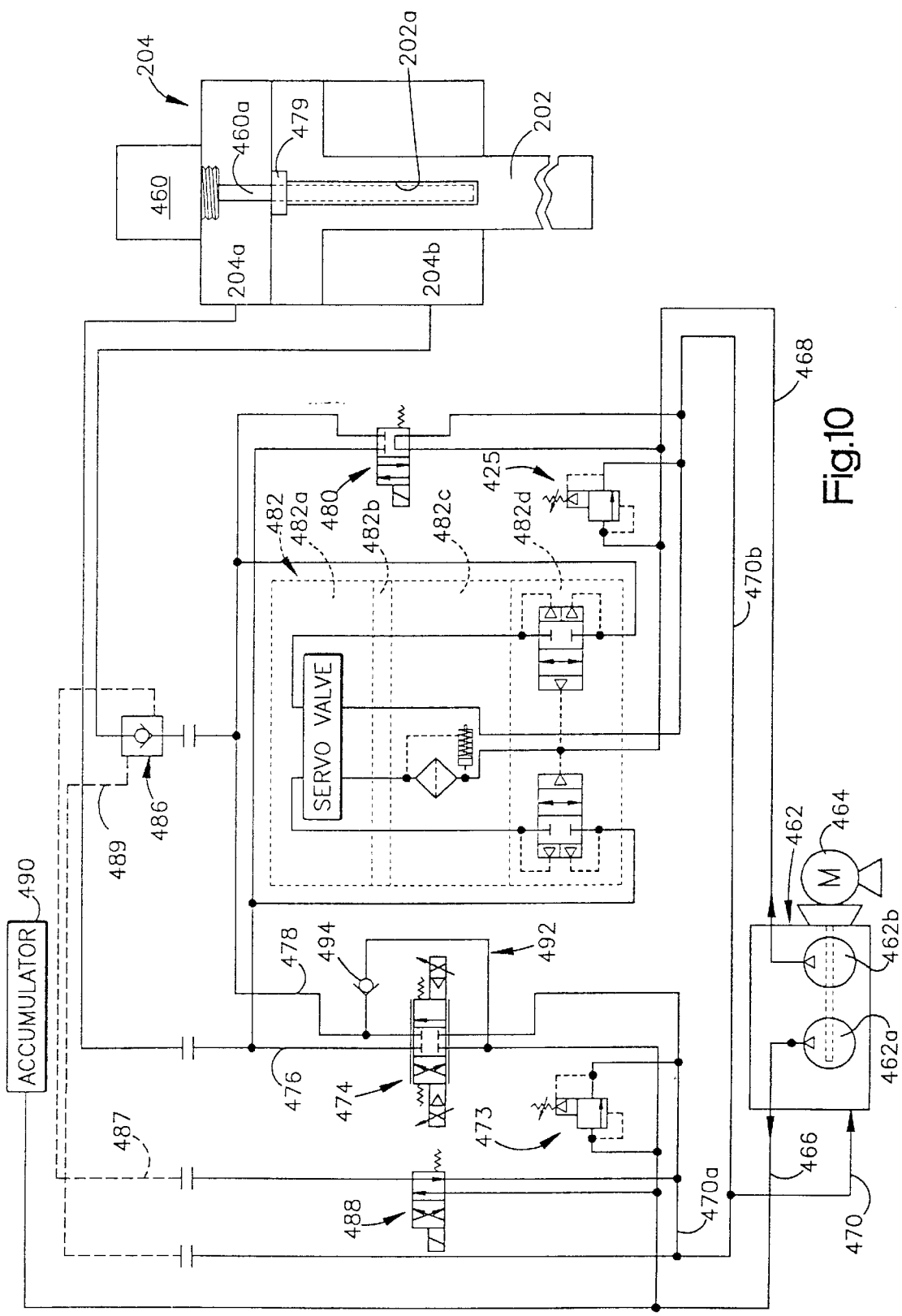
FIG. 10 is a schematic diagram of a hydraulic control circuit for the movable chuck assembly.

As can be seen from FIG. 8, moving the chuck assembly 310 toward spindle assembly 410 (via actuator 204) to cause the rims 26a, 24a to engage the upper and lower tire beads is insufficient to cause the chuck member 360 to engage the spindle 440 due to the relatively large bead width of tire "T." Thus, when the air cylinders 400 are actuated to retract the rods 406, this drives the chuck member 360 down until the tapered recess 368 thereof seats on the tapered nose 442 of spindle 440, the amount of force applied to the chuck member by the cylinders being controlled as discussed above. In order to control the distance which the upper chuck assembly 310 moves toward (and away from) the spindle 440, a sensor 460 (see FIG. 10) is provided to detect the distance the chuck assembly 310 moves relative to the fixed frame 60 of the system. In a preferred embodiment, the sensor 460 is a linear displacement transducer mounted in any suitable location on the apparatus, and preferably mounted to the hydraulic cylinder 204 (FIG. 10). A transducer available from Balluff, Inc. of Florence, Ky. and identified as a series BTL-2, can be used as the sensor 460.

This feature of the invention provides the ability to move the chuck member less than a full cycle. That is, prior art apparatus were limited in that the chuck was repeatedly reciprocated the entire distance between its fully raised and fully lowered positions. Thus, the cycle time of the apparatus was the same regardless of the width of the tire being held. As such, even if only slightly raising (or lowering) the chuck member would be sufficient to permit removal of the tire, the member was moved the entire distance. The present invention, however, permits the chuck member to be moved less than a full cycle by raising the entire chuck assembly 310 by actuator 204 and the chuck member 360 by cylinders 400. The sensor 460 monitors the location of the chuck to enable same to be moved only as much as is needed to remove the tire. Accordingly, the invention provides reduced cycle time and increased efficiency.

FIG. 10 is a schematic hydraulic control circuit for controlling movement of the chuck assembly 310. The control circuit controls the velocity at which the chuck assembly is lowered or raised, and also serves to prevent the chuck assembly from falling should hydraulic power be removed.

Referring to FIG. 10, the control circuit includes a conventional source of hydraulic pressure shown schematically and indicated generally by the reference character 462. The hydraulic source 462 produces pressurized fluid for both a "low pressure" and a "high pressure" circuit. The low pressure circuit is used to effect macro movements (extension and retraction of the rod 202) in the chuck actuator 204. The high pressure circuit used in conjunction with a servo valve is used to maintain the position of the chuck assembly 310 after a tire is clamped between the upper and lower tire rims 24, 26. The high pressure system resists the separating force that is generated between the rims 24, 26 when the tire is inflated during the test procedure.

As is conventional, the source 462 includes a low pressure pump 462a and a high pressure pump 462b, both of which are driven by a common drive motor 464. The low pressure pump 462a delivers pressurized fluid into a conduit 466, whereas, the high pressure pump 462b delivers pressurized fluid to a conduit 468. Pressurized fluid from both the low and high pressure circuits is returned to a common return or tank line 470 by branch return lines 470a, 470b.

A conventional pressure release valve 473 connected between the pressure conduit 466 and the branch return conduit 470a is used to set the level of pressure in the low pressure circuit. Another pressure relief valve 475 is used to adjust and maintain the pressure of the high pressure circuit and, as seen in FIG. 10, is connected between the high pressure conduit 468 and the branch tank return line 470b.

The low pressure system is used to effect extension and retraction of the chuck actuator 204 to allow a tire to enter the test station and to subsequently permit the tested tire to exit the test station. The flow of pressurized fluid into a cylinder end 204a and a rod end 204b of the actuator 204 is controlled by a proportional valve 474. A proportional valve available from Rexroth and denoted as a 4WRZ25E3-360-5X/6824N9ET can be used. The proportional valve selectively communicates pressurized fluid from the low pressure conduit 466 with either a feed conduit 476 or a feed conduit 478 that communicate with the cylinder end 204a or the rod end 204b of the actuator 204, respectively. Although a three position ON/OFF valve could be used, in the preferred embodiment, the valve 474 is a proportional valve so that the flow rate of pressurized fluid to the chuck cylinder 204 can be controlled. As a result, the velocity with which the rod extends or retracts can be varied. For example, when the chuck is being "manually jogged", i.e., during set-up, etc., it is generally desirable that the movement of the chuck occur very slowly. Thus, under "set-up" conditions, the proportional valve would be controlled to reduce the rate of flow of pressurized fluid to the cylinder to lower its extension or retraction speed. As is known, suitable control signals generated by a system control, are applied to the proportional valve to control both the direction of fluid flow, as well as the flow rate.

The position of the chuck 310 relative to the spindle is monitored by the sensor 460 which, as indicated above, is preferably a linear displacement transducer available from Balluff, Inc. As seen best in FIG. 10, the sensor 460 is threaded into the end of the cylinder 204 and includes a probe 460a which extends into a bore 202a formed in the piston rod or ram 202. A magnet 479 is carried by the rod at the upper end of the bore 202a. The probe 460a responds to movement of the magnet 479 and is thus able to determine the position of the rod 202.

The combination of the linear position sensor 460 and the proportional valve 474 are used to control the velocity of the upper chuck as it moves towards the lower chuck in order to control the impact between components of the upper chuck and components of the lower chuck. Because the linear displacement sensor 460 continually monitors the position of the upper chuck, as it approaches the lower chuck, the control system can apply suitable signals to the proportional valve 474 to reduce the flow rate and thus decrease the velocity at which the upper chuck moves towards the lower chuck.

When the chuck 310 reaches its desired position (the position at which the tire is clamped between the upper and lower rims 24, 26, the high pressure circuit is used to maintain the position of the chuck. In particular, when the chuck reaches the clamping position, a high pressure hold solenoid 480 is energized to activate a conventional servo valve assembly 482. The proportional valve 474 is deactivated and returns to its centered, flow blocking position.

The servo valve assembly is considered conventional and may include a Rexroth servo valve 482a, denoted as a 4WS2EM10-4X/10B2ET315Z8DM. A conventional isolation block 482b, a filter 482c and a blocking valve 482d. The blocking valve 482d is available from Sun and is identified as 4153-059-000-AFM0128. The blocking valve 482d prevents movement in the chuck 310 during the time it takes for the high pressure system to develop pressure in the servo valve assembly after the high pressure solenoid valve 480 is actuated. As is known, the servo valve assembly may effect minor movements in the chuck 310 to finalize its position and, once the position is established, it operates to resist the separating forces generated by the tire clamped between the tire rims 24, 26, after inflation.

According to a feature of the circuit, a pressure operated check valve 486 is disposed between the rod end of the cylinder and the source of pressure communicated by the proportional valve 474. The purpose of the pressure operated check valve 486 is to prevent the outflow of fluid from the rod end of the actuator 204 in the event of conduit failure, etc. which would otherwise allow the chuck 310 to move downwardly under its own weight. A solenoid-operated ON/OFF valve 488 is used to open the pressure operated check valve 486 (via pilot pressure line 487) to permit flow of fluid out of the cylinder to permit extension of the rod 204. During normal machine operation, this solenoid 488 is typically energized in order to open the check valve 486 thereby providing unrestricted movement of the actuator rod 204. The solenoid valve 488 is de-energized under machine set-up conditions, manual jogging operations, etc. The line 489 is a drain line for the valve 486 and is connected to the return line 470a.

An accumulator 490 provides additional fluid flow when the actuator 204 is being extended or retracted. The accumulator 490 communicates with the pressure line 466. A more complete explanation of the function of the accumulator 490 can be found in U.S. Pat. No. 5,029,467, entitled "Hydraulics Apparatus For Tire Uniformity Machine", which is hereby incorporated by reference.

The circuit also includes a "regenerative loop" indicated generally by the reference character 492. The loop connects the rod end feed conduit 478 the pressure conduit 466. A check valve 494 prevents flow from the pressure conduit 466 to the rod end feed conduit 478. In operation, when pressure is being fed to the cylinder end 204a of the actuator 204, fluid being forced out of the rod end travels through the pressure operated check valve 486, the regenerative loop check valve 494 and into the pressure conduit 466. By conveying the discharged fluid directly into the pressure line 466, less fluid must be supplied by the hydraulic system and, as a result, improved actuation and response times can be realized.

Figure 9:
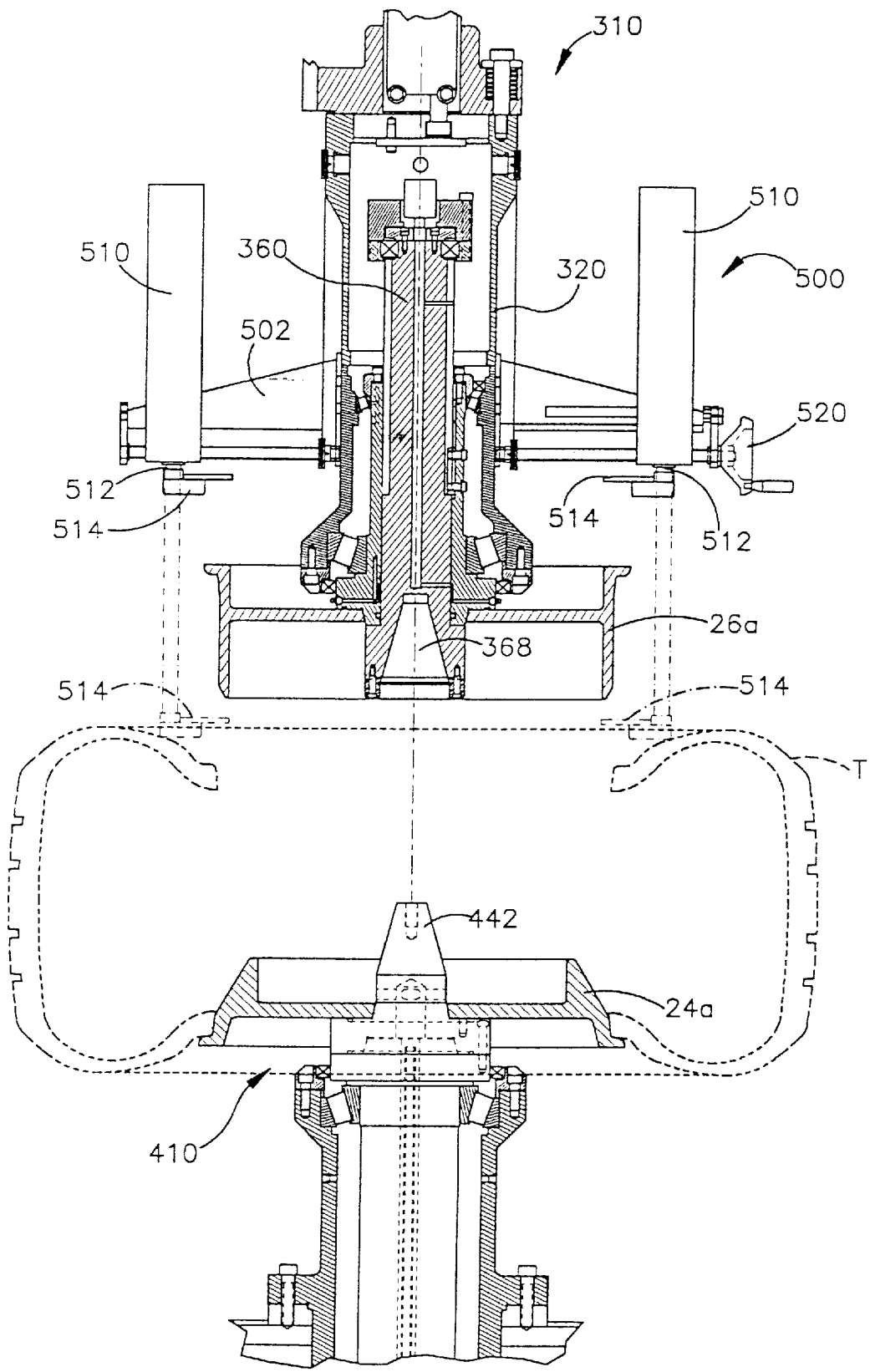
FIG. 9 is a front elevation view of the movable chuck assembly and spindle assembly, the chuck assembly being provided with a tire stripper mechanism constructed according to the invention.

FIG. 9 depicts an additional feature of the preferred embodiment, namely, a tire stripper mechanism indicated by the reference character 500 which forcibly removes the tire from the upper rim 26a. The stripper mechanism 500 includes a pair of air cylinders 510 which are mounted to a plate or suitable bracket 502 secured to the outer housing 320 of the chuck assembly by any suitable fastening means. The mechanism 500 thus is secured to and moves along with the chuck assembly 310. Each of the cylinders 510 has a rod 512 which carries a stripper member 514. Upon activation of the cylinders, the rods 512 are extended to drive the stripper members 514 downward into the tire "T" to remove the tire from upper rim 26a. FIG. 9 illustrates, in solid lines, the apparatus after stripper members 514 have been lowered to remove the tire from rim 26a and subsequently raised to their at rest position. The dashed lines in FIG. 9 show the stripper members in their tire engaging position. In operation, the sripper members are lowered to force the tire from the rim 26a and then are retracted. The chuck then is raised to permit the tire to be lifted off of the spindle and carried away from the testing station.

Additionally, adjustment means are provided for adjusting the radial position of the cylinders 510 and stripper members 514 relative to the chuck assembly so as to accommodate tires having different bead diameters. In a preferred embodiment, the adjustment means are rotatable hand-wheels 520 which move the stripper elements radially (i.e., to the left or right in FIG. 9) to accommodate tires having varying diameters. The stripper mechanism overcomes problems with prior art devices relating to efficiently and consistently removing the tire from the chuck apparatus after testing of the tire has been completed. Further, mounting the stripper member on the chuck assembly provides a compact construction which simplifies accessibility to and maintenance of the components. In addition, this feature enables a tire to be stripped while the tire rims are still together. It does not require, as is the case with many prior art machines, that the chuck be fully retracted in order to effect stripping of the tire from the upper chuck. As a result, cycle time can be decreased since the chuck does not have to be fully retracted and then fully extended between each machine cycle.

It is apparent that the present invention provides an adjustable width chuck apparatus that is especially suited for holding tires in a tire testing system and overcomes the drawbacks and limitations of prior art apparatus. The foregoing detailed description of preferred embodiments is made for purposes of providing a complete disclosure and should not be construed as limiting the scope and application of the inventive concepts disclosed herein, as many modifications and variations of the invention will be apparent to those skilled in the art.

What is claimed is:

1. A tire testing machine comprising:
 a frame including a lower section and an upper section, the lower section defining a base;
 a lower chuck fixed to the base of the frame, the lower chuck including a rotatable spindle;
 an upper chuck mounted to the upper section of the frame so as to be movable vertically with respect to the frame, the upper chuck including a rotatable chuck member;
 means for testing a tire held by the upper and lower chucks;
 a sensor for detecting the vertical position of the upper chuck with respect to the frame; and
 an actuator for raising and lowering the upper chuck with respect to the frame between fully raised and fully lowered positions
 said sensor forming part of an actuator position control for controlling actuation of said actuator, said position control operable to stop the upper chuck at any desired location between said fully raised and fully lowered positions in order to establish a variable, predetermined spacing between said upper and lower chucks, corresponding to a bead spacing of a tire to be tested.

2. A tire testing machine according to claim 1, wherein the actuator comprises a hydraulic cylinder and said actuator position control comprises a hydraulic control circuit including a pressure operated check valve that maintains the upper chuck in its raised position when hydraulic power is removed.

3. A tire testing machine according to claim 1, wherein the actuator comprises a hydraulic cylinder and wherein the sensor comprise a transducer provided on the hydraulic cylinder.

4. A tire testing machine according to claim 1, wherein the actuator comprises a hydraulic cylinder that receives hydraulic fluid from a proportional valve adapted to handle the flow of fluid required to raise and lower the upper chuck.

5. A tire testing machine according to claim 4, wherein the proportional valve controls the velocity of the upper chuck as the upper chuck is moved toward the lower chuck to control impact of the chuck member with the spindle.

6. An tire testing machine according to claim 1, wherein the upper chuck includes an inner housing rotatably mounted within an outer housing, the rotatable chuck member being slidable relative to the inner housing, wherein the actuator raises and lowers the inner and outer housings and the chuck member.

7. A tire testing machine according to claim 1, wherein the actuator for raising and lowering the upper chuck is secured to the upper section of the frame.

8. A tire testing machine according to claim 1, wherein the spindle has a drive sprocket engaged by a drive belt for rotating the spindle.

9. A tire testing machine according to claim 1, further comprising a first rim attached to the upper chuck and a second rim attached to the lower chuck, said rims being configured to engage the upper and lower beads of a tire tested by the machine.

10. A tire testing machine according to claim 9, wherein a plurality of interchangeable first and second rims are provided and are attachable to the upper and lower chucks, the plurality of rims being configured to engage different size tires.

11. A tire testing machine according to claim 9, further comprising a stripper mechanism carried by the upper chuck for forcing a tire off of one of the rims.

12. A tire testing machine according to claim 11, wherein the stripper mechanism includes at least one stripper member and a pneumatic actuator, the pneumatic actuator secured to the upper chuck and operable to drive the stripper member toward a tire mounted on the upper chuck.

13. A tire testing machine according to claim 11, wherein the stripper mechanism is provided with means for adjusting the position of the stripper member relative to the upper chuck for stripping different bead diameter tires.

14. A tire testing machine according to claim 1, wherein the actuator comprises a hydraulic cylinder including a rod that raises and lowers the upper chuck upon actuation of the cylinder, and wherein a seal is provided external to the cylinder for removing hydraulic fluid from an exterior surface of the rod during operation, the seal defining a chamber for receiving the fluid removed from the rod.

15. A tire testing machine comprising:
 a frame comprising a lower section and an upper section;
 a lower chuck fixed to the lower section of the frame, the lower chuck including a rotatable spindle;
 an upper chuck mounted to the upper section of the frame and movable vertically with respect to the frame, the upper chuck including a rotatable chuck member, said chuck member being axially movable with respect to the upper chuck;
 means for determining the uniformity of a tire held by the upper and lower chucks;
 a sensor for detecting the vertical position of the upper chuck; and
 a hydraulic actuator attached to the upper chuck for raising and lowering the upper chuck with respect to the frame to securely clamp a tire between the upper and lower chucks;
 wherein force exerted by the hydraulic actuator clamps a tire between the upper and lower chucks during testing;
 said sensor forming part of a hydraulic control circuit for controlling the position of said hydraulic actuator in order to move the upper chuck to any of various selected locations with respect to the lower chuck to clamp tires having different widths.

16. A tire testing machine according to claim 15, further comprising a stripper mechanism carried by the upper chuck for forcing a tire off of the upper chuck.

17. A tire testing machine according to claim 16, wherein the stripper mechanism includes at least one stripper member and a pneumatic actuator, the pneumatic actuator secured to the upper chuck and operable to drive the stripper member toward a tire held by the upper chuck.

18. A tire testing machine according to claim 17, wherein the stripper mechanism is provided with means for adjusting the position of the stripper member relative to the upper chuck for stripping different diameter tires.

19. A tire testing machine according to claim 15, further comprising a seal member secured to an external portion of the actuator to define a chamber for receiving hydraulic fluid, the seal member contacting a rod forming part of said actuator to prevent fluid on the rod from exiting the chamber.

20. An adjustable width chuck apparatus comprising:
 a first chuck adapted to receive a half-rim for contacting the bead of a tire, the first chuck including a rotatable spindle including a tapered male portion;
 a second chuck adapted to receive a half-rim for contacting the bead of a tire and movable toward and away from the first chuck, the second chuck including an extensible, rotatable chuck member including a tapered female portion configured to receive the tapered male portion of the rotatable spindle;

means for moving said first and second chucks towards and away from each other to establish a predetermined spacing between said half-rims; and at least one fluid pressure operated actuator operable to extend the chuck member with respect to the second chuck to move the tapered female portion into engagement with the tapered male portion of the spindle.

21. An adjustable width chuck apparatus according to claim 20, wherein the fluid pressure operated actuator is pneumatic and applies a substantially constant force to the chuck member over substantially the entire range the chuck member is moved by the actuator.

22. An adjustable width chuck apparatus according to claim 20, wherein the fluid pressure operated actuator is pneumatic and is also operable to retract the chuck member with respect to the second chuck.

23. An adjustable width chuck apparatus according to claim 20, wherein the spindle is provided with an air conduit for feeding air to an area adjacent the tapered male portion.

24. An adjustable width chuck apparatus according to claim 23, wherein the tapered female portion of the chuck member is provided with a seal for preventing air from entering an area between the tapered male portion of the spindle and the tapered female portion of the chuck member.

25. An adjustable width chuck apparatus according to claim 20, wherein the tapered male portion of the rotatable spindle and the tapered female portion of the chuck member have mating frusto-conical configurations.

26. An adjustable width chuck apparatus according to claim 20, wherein the lower chuck includes a plurality of components secured to a spindle housing, the spindle housing being detachably secured to a support frame to permit entire lower chuck to be removed therefrom.

27. An adjustable width chuck apparatus comprising:

a first chuck adapted to receive a half-rim for contacting the bead of a tire, the first chuck including rotatable spindle including a tapered male portion;

a second chuck adapted to receive a half-rim for contacting the bead of a tire and movable toward and away from the first chuck, the second chuck including an extensible, rotatable chuck member including a tapered female portion configured to receive the tapered male portion of the rotatable spindle; and at least one fluid pressure operated actuator operable to extend the chuck member with respect to the second chuck to move the tapered female portion into engagement with the tapered male portion of the spindle;

the actuator being disposed on an external portion of the chuck and providing a visual indication of the position of the extensible, tapered female portion of the chuck member with respect to the second chuck.

28. An adjustable width chuck apparatus comprising:

a first chuck adapted to receive a half-rim for contacting the bead of a tire, the first chuck including a rotatable spindle including a tapered male portion;

a second chunk adapted to receive a half-rim for contacting the bead of a tire and movable toward and away from the first chuck, the second chuck including an extensible, rotatable chuck member including a tapered female portion configured to receive the tapered male portion of the rotatable spindle;

at least one fluid pressure operated actuator operable to extend the chuck member with respect to the second chuck to move the tapered female portion into engagement with the taped male portion of the spindle; and, a pair of pneumatic actuators secured to a housing of said second chuck that drive a bracket secured to the chuck member.

29. An adjustable width chuck apparatus comprising:

a first chuck adapted to receive a half-rim for contacting the bead of a tire, the first chuck including rotatable spindle including a tapered male portion;

a second chuck adapted to receiving a half-rim for contacting the bead of a tire and movable toward and away from the first chuck, the second chuck including an extensible, rotatable chuck member including a tapered female portion configured to receive the tapered male portion of the rotatable spindle;

at least one fluid pressure operated actuator operable to extend the chuck member with respect to the second chuck to move the tapered female portion into engagement with the tapered male portion of the spindle; and, means for stripping a tire from the second chuck.

30. A tire testing machine comprising:

a frame including a lower section and an upper section, the lower section defining a base;

a lower chuck fixed to the base of the frame, the lower chuck including a rotatable spindle;

an upper chuck mounted to the upper section of the frame so as to be movable vertically with respect to the frame, the upper chuck including a rotatable chuck member;

means for testing a tire held by the upper and lower chucks;

a sensor for detecting the vertical position of the upper chuck with respect to the frame; and an actuator for raising and lowering the upper chuck with respect to the frame between fully raised and fully lowered positions, wherein the actuator is operable to stop the upper chuck at any desired location between said fully raised and fully lowered positions;

said upper chuck including an inner housing rotatably mounted within an outer housing, the rotatable chuck member being slidable relative to the inner housing, wherein the actuator raises and lowers the inner and outer housings and the chuck member.

31. A tire testing machine comprising:

a frame including a lower section and an upper section, the lower section defining a base;

a lower chuck fixed to the base of the frame, the lower chuck including a rotatable spindle;

an upper chuck mounted to the upper section of the frame so as to be movable vertically with respect to the frame, the upper chuck including a rotatable chuck member;

means for testing a tire held by the upper and lower chucks;

a sensor for detecting the vertical position of the upper chuck with respect to the frame;

an actuator for raising and lowering the upper chuck with respect to the frame between fully raised and fully lowered positions, wherein the actuator is operable to stop the upper chuck at any desired location between said fully raised and fully lowered positions;

a first rim attached to the upper chuck and a second rim attached to the lower chuck, said rims being configured to engage the upper and lower beads of a tire tested by the machine; and a stripper mechanism carried by the upper chuck for forcing a tire off of one of the rims.

32. A tire testing machine according to claim 31, wherein the stripper mechanism is provided with means for adjusting the position of the stripper member relative to the upper chuck for stripping different bead diameter tires.

* * * * *